United States Patent
Takenaka

(10) Patent No.: US 7,295,863 B2
(45) Date of Patent: Nov. 13, 2007

(54) PORTABLE TELEPHONE

(75) Inventor: Hidetoshi Takenaka, Saitama (JP)

(73) Assignee: NEC Corporation, Tokyo (JP)

( * ) Notice: Subject to any disclaimer, the term of this patent is extended or adjusted under 35 U.S.C. 154(b) by 371 days.

(21) Appl. No.: 09/791,209

(22) Filed: Feb. 23, 2001

(65) Prior Publication Data

US 2002/0098875 A1 Jul. 25, 2002

(30) Foreign Application Priority Data

Feb. 24, 2000 (JP) ............................ 2000-047664

(51) Int. Cl.
- *H04M 1/00* (2006.01)
- *H04M 3/42* (2006.01)
- *H04M 11/10* (2006.01)
- *H04M 1/663* (2006.01)

(52) U.S. Cl. ............... 455/567; 455/566; 455/414.1; 455/550.1; 455/412.2; 455/413

(58) Field of Classification Search ............... 455/128, 455/566–567, 66, 88, 575, 435, 420, 558, 455/412.1–412.2, 413, 414.1, 3.06, 401, 455/404.1, 550.1, 556.2, 415, 418, 425, 517, 455/575.1; 379/52, 88.12, 88.15, 7.58, 7.59, 379/7.56, 7.61, 7.62, 7.74, 88.11, 88.19–88.22, 379/164, 179, 373.01, 373.02, 373.03, 373.04, 379/374.01, 374.02, 67.1, 88.1, 142.01, 142.09, 379/142.17, 185, 252, 215.01, 911, 374.03, 379/375.01, 375.06; 340/407.1, 815.4, 815.45, 340/61, 7.55–7.59, 6, 62, 7.6–7.62; 373/374.03; 370/375.01, 376.01

See application file for complete search history.

(56) References Cited

U.S. PATENT DOCUMENTS

| | | | | |
|---|---|---|---|---|
| 5,258,751 A * | 11/1993 | DeLuca et al. | ............. | 340/7.52 |
| 5,835,863 A * | 11/1998 | Ikenouchi et al. | .......... | 455/567 |
| 5,845,219 A * | 12/1998 | Henriksson | .................. | 455/567 |
| 5,848,362 A * | 12/1998 | Yamashita | ................... | 455/567 |
| 6,124,801 A * | 9/2000 | Yamazaki | ................... | 340/7.62 |
| 6,252,515 B1* | 6/2001 | Mottier et al. | ............... | 340/7.6 |
| 6,263,218 B1* | 7/2001 | Kita | ........................... | 455/567 |
| 6,327,495 B1* | 12/2001 | Iwabuchi et al. | ........... | 600/547 |
| 6,373,925 B1* | 4/2002 | Guercio et al. | ............... | 379/82 |
| 6,438,392 B1* | 8/2002 | Toba | .......................... | 455/567 |
| 6,466,782 B2* | 10/2002 | Ishikawa et al. | ......... | 455/412.2 |
| 6,564,056 B1* | 5/2003 | Fitzgerald | .................... | 340/5.1 |
| 6,573,825 B1* | 6/2003 | Okano | ......................... | 340/7.51 |
| 6,574,489 B1* | 6/2003 | Uriya | .......................... | 455/567 |
| 2002/0098875 A1* | 7/2002 | Takenaka | .................... | 455/566 |

FOREIGN PATENT DOCUMENTS

CN      1166757 A     12/1997

(Continued)

*Primary Examiner*—Meless Zewdu
(74) *Attorney, Agent, or Firm*—Scully, Scott, Murphy & Presser, P.C.

(57) ABSTRACT

Disclosed is a portable telephone in which the informing of a reception is performed at the time of the reception by causing a buzzer to generate its reception sound and simultaneously a history of the reception is recorded in a memory, wherein in the case no response to the informing of the reception is made and the history of the reception is recorded in the memory, the buzzer generates an alarming sound until the history of the reception is confirmed.

19 Claims, 6 Drawing Sheets

FOREIGN PATENT DOCUMENTS

| | | |
|---|---|---|
| EP | 0 803 848 A1 * | 10/1997 |
| GB | 2 253 541 A | 9/1992 |
| GB | 2 284 693 A | 6/1995 |
| GB | 2316574 A | 2/1998 |
| GB | 2 333 205 A | 7/1999 |
| JP | H08-265413 | 10/1996 |
| JP | H09-289666 | 11/1997 |
| JP | H10-075484 | 3/1998 |
| JP | H11-068923 | 3/1999 |

* cited by examiner (a)

(b)

(c)

PORTABLE TELEPHONE

FIELD OF THE INVENTION

The present invention relates to a portable telephone having a function of recording the history of reception.

BACKGROUND OF THE INVENTION

Nowadays, many types of portable telephones are provided with a function of recording the history of reception. In these types of portable telephones, in the case no response to a phone call is made and the history of the reception of the phone call has been recorded, on an LCD display part there is displayed information such as, for example, a "someone called you". Thereby, the user is informed of that a call was received.

FIG. 1 is a flow chart illustrating the operation at the time of a reception of a conventional portable telephone.

When a call from someone is received (step S61), the history of reception is recorded (step S62), and thereupon it is determined whether there is a response to the call (step S63).

In the case it is determined in step S63 that there is a response, a phone talk between the user and the calling person is made (step S68). When the phone talk is ended (step S69), on the LCD display part there is displayed an ordinary standby window (step S67).

On the other hand, in the case it is determined in step S63 that there is no response, on the LCD display part there is displayed information of, for example, "someone called you" (step S64). Subsequently, it is determined whether the history of the received call is confirmed (step S65).

In the case it is determined in step S65 that the history of the received call is confirmed, the information of "someone called you" displayed on the LCD display part is erased (step S66). Thereafter, the ordinary-standby window is displayed on the LCD displayed part (step S67).

On the other hand, in the case it is determined in step S65 that the history of the received call is not confirmed, the flow returns again to the processing of step S65, and then the confirmation of the history of the received call is conducted.

However, a portable telephone is one that is usually carried by the user while being put in the user's bag or pocket. Therefore, there is a case where the user does not become aware of the reception sound by reason of the surrounding noises or the like. In such a case, even when in a later piece of processing the information of "someone called you" has been displayed on the LCD display part, there is the following possibility. Namely, the information on the window is left as it stands for a large length of time until the user looks at this window of the LCD display part.

Especially, in a folding type portable telephone that is carried in a state of its being folded up, in order for the user to look at the window of the LCD display part it is necessary to open the portable telephone. For this reason, the probability that the information of the window will be left as is until the next day becomes high.

SUMMARY OF THE INVENTION

The present invention has been made in view of the above-described points in problem that are inherent in the conventional technique and has an object to provide a portable telephone that can inform the user earlier of the fact that a call has been received.

To attain the above object, the present invention provides a portable telephone in which the informing of a reception is performed at the time of the reception by causing a buzzer to generate its reception sound and simultaneously a history of the reception is recorded in a memory, wherein in the case no response to the informing of the reception is made and the history of the reception is recorded in the memory, the buzzer generates an alarming sound until the history of the reception is confirmed.

Also, the buzzer generates its alarming sound for a prescribed time length in units of a prescribed time length until the history of the reception is confirmed.

Also, the memory records therein a telephone number that is designated beforehand, and the buzzer generates its alarming sound until the history of the reception is confirmed only in the case a telephone number of the reception coincides with the previously designated telephone number that is recorded in the memory.

Also, the invention provides a portable telephone in which the informing of a reception is performed at the time of the reception by causing an LED to turn "on"/"off" and simultaneously a history of the reception is recorded in a memory, wherein in the case no response to the informing of the reception is made and the history of the reception is recorded in the memory, the LED turns "on"/"off" until the history of the reception is confirmed.

Also, the LED turns "on"/"off" for a prescribed time length in units of a prescribed time length until the history of the reception is confirmed.

Also, the memory records therein a telephone number that is designated beforehand, and the LED turns "on"/"off" until the history of the reception is confirmed only in the case the telephone number of the reception coincides with the previously designated telephone number that is recorded in the memory.

Also, the invention provides a portable telephone in which the informing of a reception is performed at the time of the reception by causing a vibrator to vibrate and simultaneously a history of the reception is recorded in a memory, wherein in the case no response to the informing of the reception is made and the history of the reception is recorded in the memory, the vibrator vibrates until the history of the reception is confirmed.

Also, the vibrator vibrates for a prescribed time length in units of a prescribed time length until the history of the reception is confirmed.

Also, the memory records therein a telephone number that is designated beforehand; and the vibrator vibrates until the history of the reception is confirmed only in the case the telephone number of the reception coincides with the previously designated telephone number that is recorded in the memory.

Also, a portable telephone in which the informing of a reception is performed at the time of the reception by causing a buzzer to generate its alarming sound and causing an LED to turn "on"/"off" and simultaneously a history of the reception is recorded in a memory, wherein in the case no response to the informing of the reception is made and the history of the reception is recorded in the memory, the buzzer generates its alarming sound until the history of the reception is confirmed, and in the case no response to the informing of the reception is made and the history of the reception is recorded in the memory, the LED turns "on"/"off" until the history of the reception is confirmed.

The buzzer generates its alarming sound for a prescribed time length in units of a prescribed time length until the history of the reception is confirmed, and the LED turns "on"/"off" for a prescribed time length in units of a prescribed time length until the history of the reception is confirmed.

Also, the memory records therein a telephone number that is designated beforehand, and the buzzer generates its alarming sound until the history of the reception is confirmed only in the case the telephone number of the reception coincides with the previously designated telephone number that is recorded in the memory, and the LED turns "on"/"off" until the history of the reception is confirmed only in the case the telephone number of the reception coincides with the previously designated telephone number that is recorded in the memory.

Also, the invention provides a portable telephone in which the informing of a reception is performed at the time of the reception by causing a buzzer to generate its alarming sound and causing a vibrator to vibrate and simultaneously a history of the reception is recorded in a memory, wherein in the case no response to the informing of the reception is made and the history of the reception is recorded in the memory, the buzzer generates its alarming sound until the history of the reception is confirmed, and in the case no response to the informing of the reception is made and the history of the reception is recorded in the memory, the vibrator vibrates until the history of the reception is confirmed.

Also, the buzzer generates its alarming sound for a prescribed time length in units of a prescribed time length until the history of the reception is confirmed, and the vibrator vibrates for a prescribed time length in units of a prescribed time length until the history of the reception is confirmed.

Also, the memory records therein a telephone number that is designated beforehand, the buzzer generates its alarming sound until the history of the reception is confirmed only in the case the telephone number of the reception coincides with the previously designated telephone number that is recorded in the memory, and the vibrator vibrates until the history of the reception is confirmed only in the case the telephone number of the reception coincides with the previously designated telephone number that is recorded in the memory.

Also, the invention provides a portable telephone in which the informing of a reception is performed at the time of the reception by causing an LED to turn "on"/"off" and causing a vibrator to vibrate and simultaneously a history of the reception is recorded in a memory, wherein in the case no response to the informing of the reception is made and the history of the reception is recorded in the memory, the LED turns "on"/"off" until the history of the reception is confirmed, and in the case no response to the informing of the reception is made and the history of the reception is recorded in the memory, the vibrator vibrates until the history of the reception is confirmed.

Also, the LED turns "on"/"off" for a prescribed time length in units of a prescribed time length until the history of the reception is confirmed, and the vibrator vibrates for a prescribed time length in units of a prescribed time length until the history of the reception is confirmed.

Also, the memory records therein a telephone number that is designated beforehand, the LED turns "on"/"off" until the history of the reception is confirmed only in the case the telephone number of the reception coincides with the previously designated telephone number that is recorded in the memory, and the vibrator vibrates until the history of the reception is confirmed only in the case the telephone number of the reception coincides with the previously designated telephone number that is recorded in the memory.

Also, the invention provides a portable telephone in which the informing of a reception is performed at the time of the reception by causing an LED to turn "on"/"off" and causing a vibrator to vibrate and simultaneously a history of the reception is recorded in a memory, the portable telephone comprising a buzzer that at the time of a reception informs the reception by generating a reception sound and that, in the case no response to the informing of the reception is made and the history of the reception is recorded in the memory, generates its alarming sound until the history of the reception is confirmed, wherein in the case no response to the informing of the reception is made and the history of the reception is recorded in the memory, the LED turns "on"/"off" until the history of the reception is confirmed, and in the case no response to the informing of the reception is made and the history of the reception is recorded in the memory, the vibrator vibrates until the history of the reception is confirmed.

Also, the buzzer generates its alarming sound for a prescribed time length in units of a prescribed time length until the history of the reception is confirmed, the LED turns "on"/"off" for a prescribed time length in units of a prescribed time length until the history of the reception is confirmed, and the vibrator vibrates for a prescribed time length in units of a prescribed time length until the history of the reception is confirmed.

Also, the memory records therein a telephone number that is designated beforehand, the buzzer generates its alarming sound until the history of the reception is confirmed only in the case the telephone number of the reception coincides with the previously designated telephone number that is recorded in the memory, the LED turns "on"/"off" until the history of the reception is confirmed only in the case the telephone number of the reception coincides with the previously designated telephone number that is recorded in the memory; and the vibrator vibrates until the history of the reception is confirmed only in the case the telephone number of the reception coincides with the previously designated telephone number that is recorded in the memory.

In the present invention that is constructed as stated above, in the case no response to the informing of the reception is made and the history of the reception is recorded, one or more of the alarming sound generation operation, the vibrator vibration operation, and the LED "on"/"off" operation are performed until the history of the reception is confirmed.

As a result of this, the user is urged to confirm the history of the reception. Therefore, the fact that a call has been received is informed to the user earlier.

DESCRIPTION OF THE PREFERRED EMBODIMENTS

An embodiment of the present invention will hereafter be explained with reference to the drawings.

Figure 2:
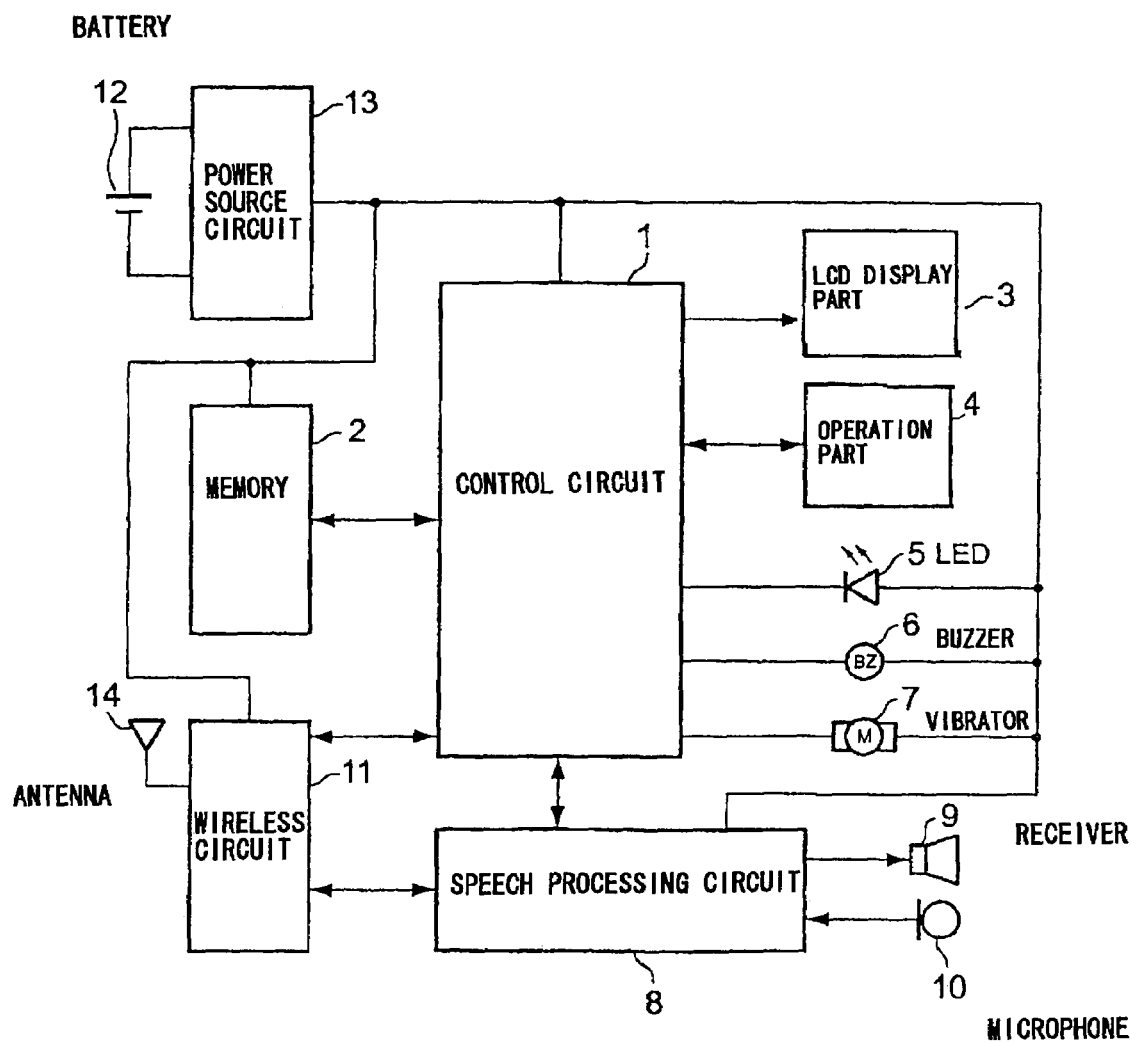
FIG. 2 is a view illustrating an embodiment of a portable telephone according to the present invention.
Figure 3:
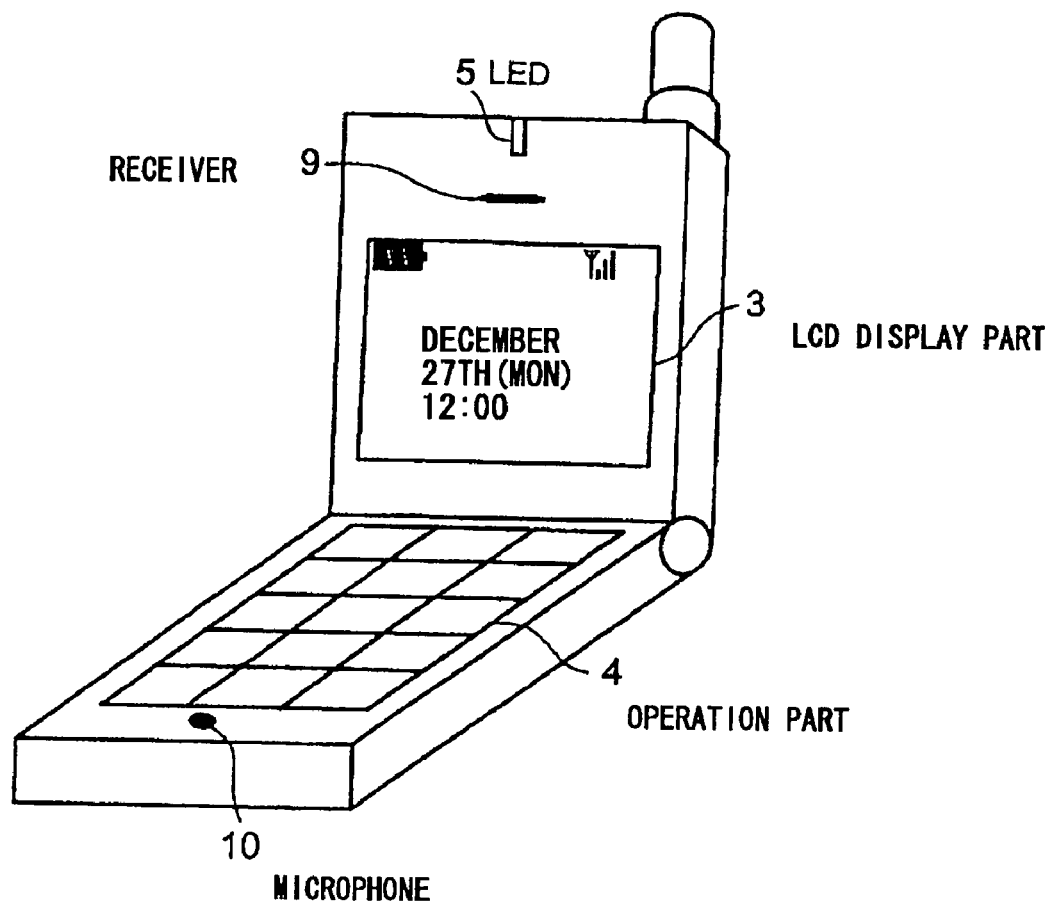
FIG. 3 is an outer appearance view of the portable telephone illustrated in FIG. 2.

FIG. 2 is a view illustrating an embodiment of a portable telephone according to the present invention. FIG. 3 is an outer appearance view of the portable telephone illustrated in FIG. 2 and shows a collapsible portable telephone.

As illustrated in FIGS. 2 and 3, the portable telephone according to this embodiment comprises a memory 2 that has recorded therein a reception history, a phone book (names and phone nos.) the user has registered, etc., an LCD display part 3 that displays phone numbers, time information, a residual capacity of battery, a reception field level, etc., an operation part 4 through that the user inputs a phone number, etc., an LED 5 that turns "on"/"off" when reception has been made, a buzzer 6 that generates a reception sound when reception has been made, a vibrator 7 that makes a vibration when reception has been made, a wireless circuit 11 for performing wireless communication of a speech signal through an antenna 14, a speech-signal processing circuit 8 that demodulates a speech signal that has been transmitted over to the wireless circuit 11 to thereby output the demodulated signal to a receiver 9 and that modulates a speech signal that has been obtained through a microphone 10 to thereby output the modulated signal to the wireless circuit 11, a control circuit 1 for performing state detection or control of the memory 2, LCD display part 3, operation part 4, LED 5, buzzer 6, vibrator 7, speech-signal processing circuit 8, and wireless circuit 11, and a power source circuit 13 that is connected to a battery 12 and that is for the purpose of supplying a stable power source to the control circuit 1, memory 2, LED 5, buzzer 6, vibrator 7, speech-signal processing circuit 8, and wireless circuit 11. In the case no response to a reception is made and a history of this reception is recorded in the memory 2, the LED 5 turns "on"/"off", the vibrator 7 vibrates, or the buzzer 6 generates an alarming sound.

In the LCD display part 3, at the times when the telephone is in an ordinary standby, when reception is made, and when no response to a reception is made and a history of this reception is recorded in the memory 2, different information's are displayed, respectively.

Figure 4:
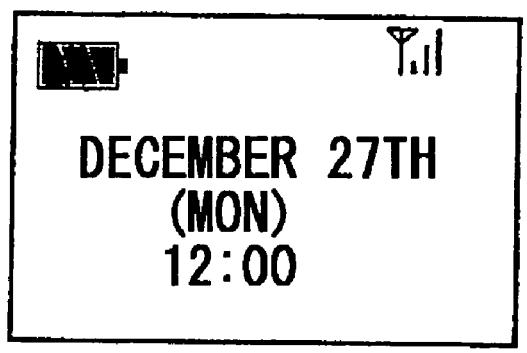
FIGS. 4(a), 4(b), and 4(c) each are a view illustrating information displayed on an LCD display part illustrated in FIG. 2.
Figure 4:
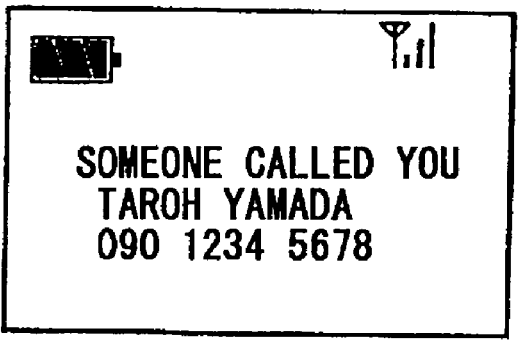
Figure 4:
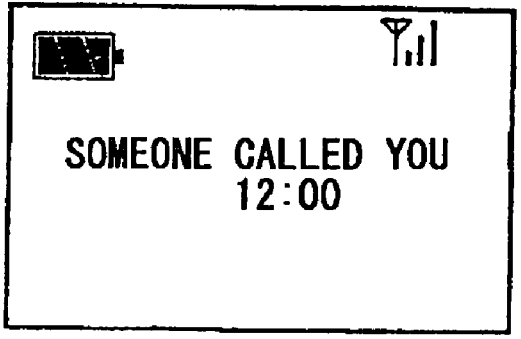

FIG. 4 is a view illustrating information displayed on the LCD display part 3 illustrated in FIG. 2. FIG. 4(a) is information at the time when the telephone is in an ordinary standby; FIG. 4(b) is information at the time when reception is made; and FIG. 4(c) is information at the time when no response to a reception is made and a history of this reception is recorded.

In the LCD display part 3, at an ordinary standby such as after closure of the initial power source, as illustrated in FIG. 4(a), a calendar that shows the present time is displayed. When a call is received from a person who is registered in the phone book recorded in the memory 2, as illustrated in FIG. 4(b) this person's name and phone number are displayed. Also, when no response to a reception is made and a history of this reception is recorded, as illustrated in FIG. 4(c) the present time is displayed along with the letters "someone called you".

The operation at the time of reception of the portable telephone that is constructed as stated above will now be explained with use of a flow chart. Here, the operation at the time of reception in a state where the present portable telephone has had an initial power source closed thereto and the LCD display part 3 has displayed thereon the calendar (see FIG. 4(a)) at the ordinary standby will be explained.

Figure 5:
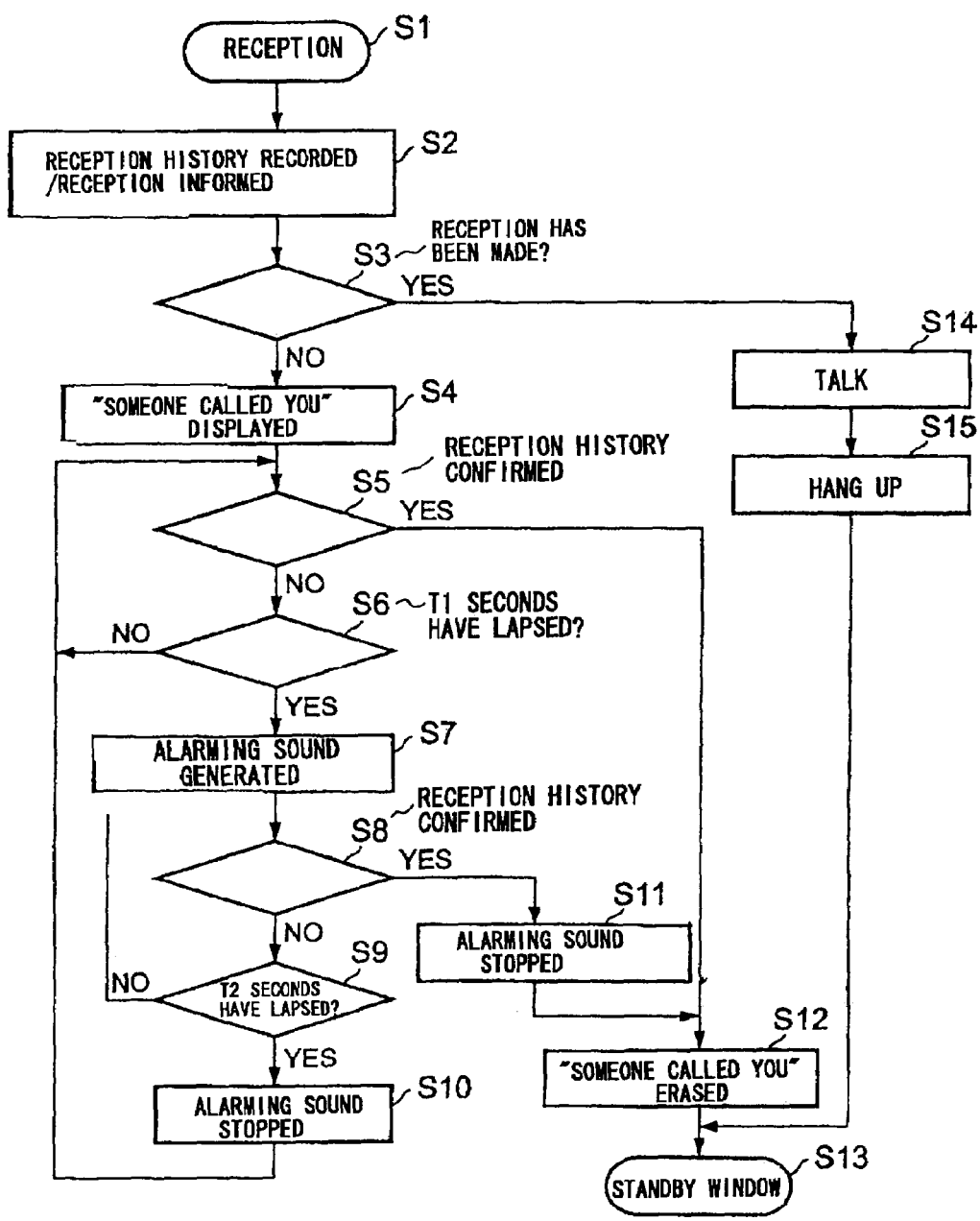
FIG. 5 is a flow chart illustrating an example of the operation at the time of reception of the portable telephone illustrated in FIG. 2.

FIG. 5 is a flow chart illustrating an example of the operation at the time of reception of the portable telephone illustrated in FIG. 2.

When a call is made from someone (step S1), in the control circuit 1, control is performed of causing a reception history to be recorded in the memory 2, causing the LED 5 to turn "on"/"off", causing the LCD display part 3 to display information (see FIG. 4(b)) at the time of reception, driving the buzzer 6 to generate a reception sound, or causing the vibrator 7 to vibrate. As a result of this, the reception of the call is informed to the user and simultaneously the history of the reception is recorded in the memory 2 (step S2).

Next, it is determined whether the user has become aware of the informing of the reception and he has made a response to the reception (step S3). In the case it has been determined that the user's response has been made, a phone talk between the user and the calling person is performed (step S14). Then, when the phone talk is ended (step S15), the respective constituent elements provided within the portable telephone are operationally changed to their ordinary standby. On the other hand, the information indicating the ordinary standby (see FIG. 4(a)) is displayed on the LCD display part 3 (step S13).

Also, in the case in step S3 the user has not become aware of the informing of the reception and, because of no response made by him, the calling person has rung off and, resultantly, it has been determined that no response has been made by the user, the following results. Namely, on the LCD display part 3, there is displayed the information (see FIG. 4(c)) including therein the letters "someone called you" (step S4).

Subsequently, it is determined whether the reception history has been confirmed (step S5). In the case it has been determined that the user has confirmed the reception history by his prescribed operation, the information including therein the letters "someone called you" displayed on the LCD display part 3 is erased (step S12). Then, the flow proceeds to the processing of a step S13.

On the other hand, when it has been determined in step S5 that the user has not confirmed the reception history, it is determined whether the time length that has lapsed from the point in time of this determination is within a time length of T1 seconds (step S6). In the case it has been determined that that time length is so, the flow returns to the processing of the step S5.

Accordingly, in the case it has been determined in step S5 that the reception history has been confirmed within a time length of T1 seconds as counted from the point in time when the first determination of whether the reception history has been confirmed was made, the following results. Namely, the flow proceeds to the processings of steps S12 and S13, and then on the LCD display part 3 there is displayed the standby window(see FIG. 4(a)).

In contrast, in the case it has been determined in step S5 that the reception history has not been confirmed even after a time length of T1 seconds as counted from the point in time when the first determination of whether the reception history has been confirmed was made, the following results. Namely, the control circuit causes the buzzer 6 to generate an alarming sound (step S7), whereby it is again determined whether the reception history has been confirmed (step S8).

In the case it has been determined in step S8 that the user has confirmed the reception history by his prescribed operation, the generation of the alarming sound by the buzzer 6 is stopped (step S11). Thereafter, the flow proceeds to the processing of the step 12.

On the other hand, when in step S8 it has been determined that the user has not confirmed the reception history, it is determined whether the time length that has elapsed from the point in time when a transfer was made from step S7 to step S8 is within a time length of T2 seconds (step S9). In the case that time length is within a time length of T2 seconds, the flow returns to the processing of the step S7.

Accordingly, in the case it has been determined in step S8 that the reception history has been confirmed within a time length of T2 seconds as counted from the point in time when the first determination of whether the reception history has been confirmed was made, the following results. Namely, the alarm is stopped in step S11 and then the flow proceeds to the processings of steps S12 and S13, and then on the LCD display part 3 there is displayed the standby window (see FIG. 4(a)).

In contrast, in the case it has been determined in step S8 that the reception history has not been confirmed even after a time length of T2 seconds as counted from the point in time when the first determination was made, the following results. Namely, the generation of the alarming sound by the buzzer 6 is stopped (step S10). Then, the flow again returns to the processing of the step S5.

As described above, in this embodiment, in the case no response to the forming of the reception is made and the reception history is recorded in the memory 2, the alarming sound is generated for a time length of T2 seconds in units of a time length of T1 seconds until the reception history is confirmed.

As a result of this, because the user is urged to confirm the reception history, the fact that the reception has been made is informed earlier to the user.

It is to be noted that the above-described time lengths T1 and T2 each are a given length of time. Therefore, each of the time lengths T1 and T2 may be one that is preset in the present portable telephone or may be one that the user arbitrarily sets.

Figure 1:
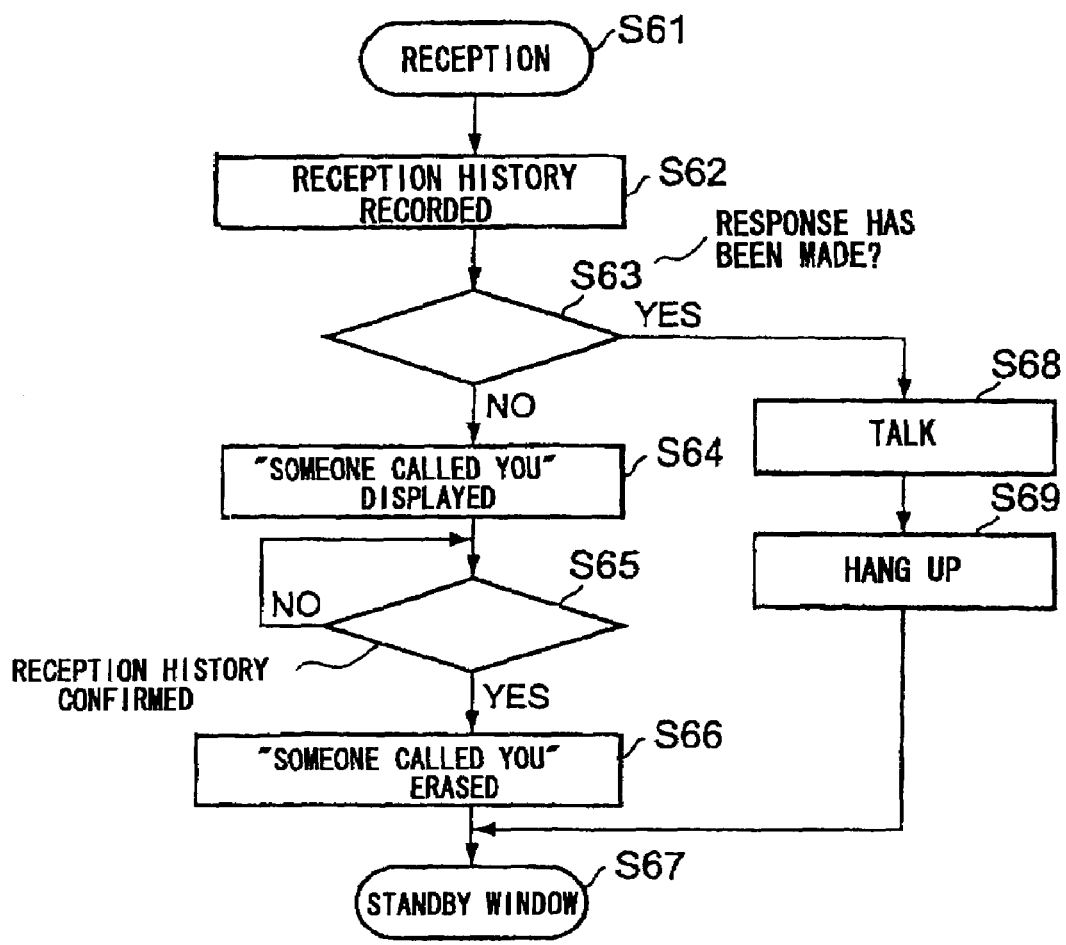
FIG. 1 is a flow chart illustrating an example of the operation at the time of reception of a conventional portable telephone.
Figure 6:
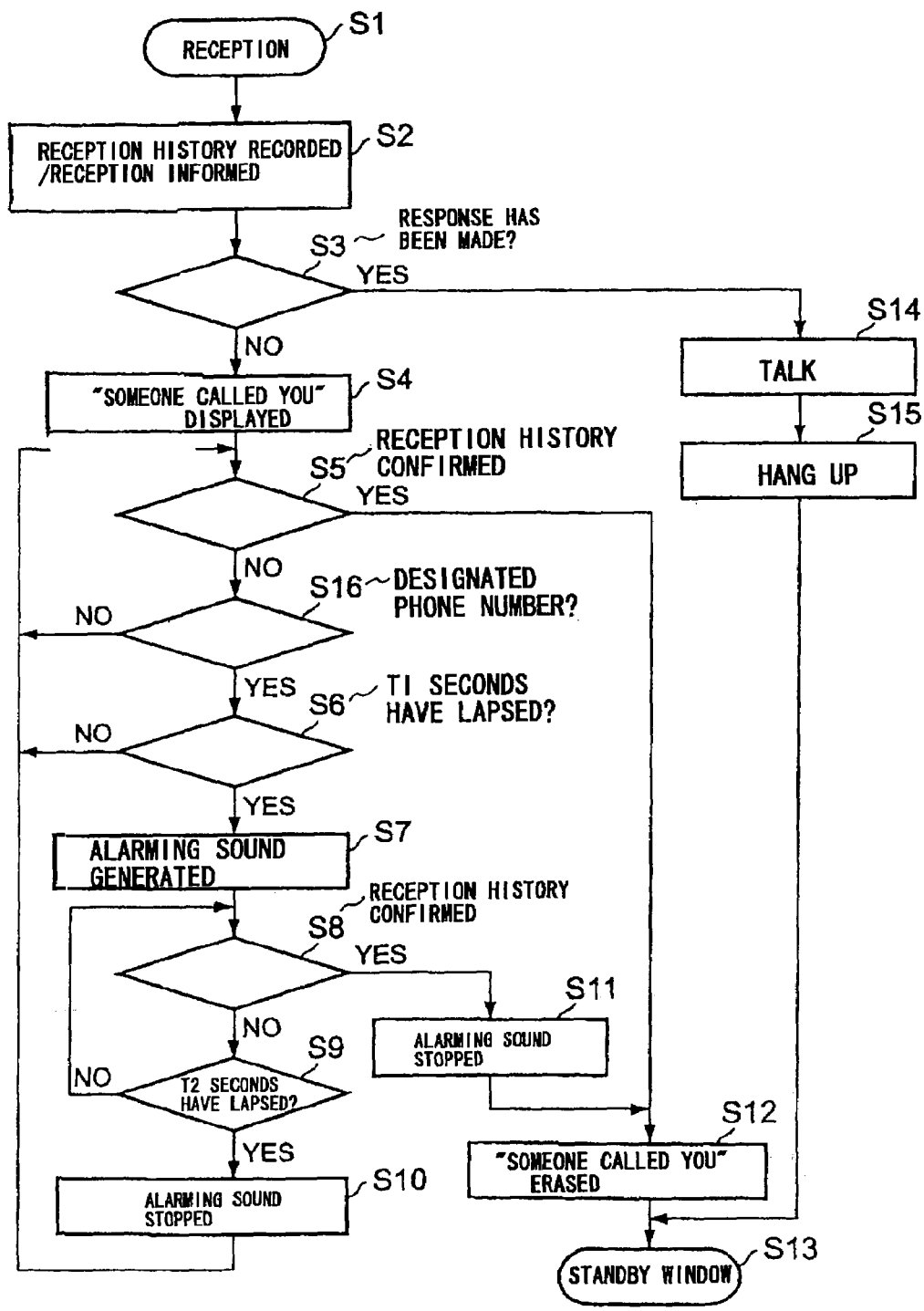
FIG. 6 is a flow chart illustrating another example of the operation at the time of reception of the portable telephone illustrated in FIG. 2.

FIG. 6 is a flow chart illustrating another example of the operation at the time of reception of the portable telephone illustrated in FIG. 1.

In this example, it is arranged that only when the phone number the user has designated beforehand among the phone numbers registered in the phone book in the memory 2 has coincided with the phone number recorded in the reception history in the memory 2, the flow is transferred to the processing of the alarm-sound generation in the steps from S6 to S11. To this end, with respect to the example illustrated in FIG. 5, a step S16 is added as the processing that is to be performed next to the step S5. It is to be noted that since other processings than that in step S16 are the same as the corresponding pieces of processing in the example illustrated in FIG. 5, a detailed explanation thereof is omitted.

In step S16, it is determined after a determination has been made in step S5 of that the reception history has not been confirmed whether the phone number designated beforehand coincides with the phone number recorded in the reception history. And, only in the case the former coincides with the latter, the flow proceeds to the processings in steps S6 to S11, thereupon the processing of generating an alarm sound is performed.

Incidentally, in the case in step S16 it has been determined that the phone number designated beforehand does not coincide with the phone number recorded in the reception history, the flow does not proceed to the processing of generating an alarm sound in steps S6 to S11. But, the flow returns to the processing in step S13, in which confirmation of the reception history is again performed.

As the contents of the processing in step S16, the following can be taken up as an example. Namely, only in the case the reception has notified its own phone number to the present user's telephone, the flow is transferred to the alarm-sound generation processing in steps S6 to S11. On the other hand, in the case the reception has notified no phone number of its own, the flow is not transferred to the alarm-sound generation processing. Various kinds of settings are possible according to the user's choice. Thereby, it is possible to further enhance the phone's convenience of use.

In each of the examples illustrated in FIGS. 5 and 6, an explanation has been given of a construction wherein in the case no response is made to the informing of a reception and the history of this reception is recorded in the memory 2, the alarming sound of the buzzer 6 is generated until the history of the reception is confirmed. However, in the present invention, a construction of causing the vibrator 7 to vibrate, or a construction of causing the LED 5 to turn "on"/"off", until the history of the reception is confirmed, may be adopted. Further, there may be adopted a construction wherein any two of the three operations in combination: lighting up of the LED 5, generation of the buzzer 6 sound, and vibration of the vibrator 7 are performed in combination. In addition, there may be adopted a construction having added thereto a function to permit the user to arbitrarily select combinations of these operations.

Also, in this embodiment, an explanation has been given of the construction of the collapsible type portable telephone. However, as the construction of the portable telephone according to the present invention, it is not limited to a collapsible type but may be other construction than this collapsible type one.

As has been explained above, in the present invention, it has been arranged that in the case no response to the informing of a reception and the history of this reception is recorded, one or more of the generation of an alarming sound by the buzzer, the vibration made by the vibrator, and the lighting up of the LED are performed until the history of the reception is confirmed. Therefore, it is possible to urge the user to confirm the history of the reception and it is thereby possible to inform the user earlier of the fact that the reception has been made.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A portable telephone in which a process of informing of a reception of an incoming voice call is performed during the reception by causing a buzzer to generate its reception sound and simultaneously a history of the reception is recorded in a memory,
   wherein in the case no response to the informing of the reception is made and the history of the reception is recorded in the memory, the buzzer generates an alarming sound until the history of the reception is confirmed;
   wherein the memory records therein at least one telephone number that is designated beforehand, the designated telephone number being of a potential originator of a call; and
   the buzzer generates its alarming sound until the history of the reception is confirmed only in the case a telephone number of the reception coincides with the previously designated telephone number that is recorded in the memory.

2. A portable telephone according to claim 1, wherein the buzzer generates its alarming sound for a prescribed time length in units of a prescribed time length until the history of the reception is confirmed.

3. A portable telephone in which a process of informing of a reception of an incoming voice call is performed during the reception by causing an LED to turn "on" "off" and simultaneously a history of the reception is recorded in a memory,
   wherein in the case no response to the informing of the reception is made and the history of the reception is recorded in the memory, the LED turns "on" "off" until the history of the reception is confirmed;
   wherein the memory records therein at least one telephone number that is designated beforehand, the designated telephone number being of a potential originator of a call; and
   the LED turns "on"/"off" until the history of the reception is confirmed only in the case the telephone number of the reception coincides with the previously designated telephone number that is recorded in the memory.

4. A portable telephone according to claim 3, wherein the LED turns "on"/"off" for a prescribed time length in units of a prescribed time length until the history of the reception is confirmed.

5. A portable telephone in which a process of informing of a reception of an incoming voice call is performed during the reception by causing a vibrator to vibrate and simultaneously a history of the reception is recorded in a memory, wherein
   in the case no response to the informing of the reception is made and the history of the reception is recorded in the memory, the vibrator vibrates until the history of the reception is confirmed;
   wherein the memory records therein at least one telephone number that is designated beforehand, the designated telephone number being of a potential originator of a call; and
   the vibrator vibrates until the history of the reception is confirmed only in the case the telephone number of the reception coincides with the previously designated telephone number that is recorded in the memory.

6. A portable telephone according to claim 5, wherein the vibrator vibrates for a prescribed time length in units of a prescribed time length until the history of the reception is confirmed.

7. A portable telephone in which a process of informing of a reception of an incoming voice call is performed during the reception by causing a buzzer to generate its alarming sound and causing an LED to turn "on"/"off" and simultaneously a history of the reception is recorded in a memory, wherein
   in the case no response to the informing of the reception is made and the history of the reception is recorded in the memory, the buzzer generates its alarming sound until the history of the reception is confirmed; and
   in the case no response to the informing of the reception is made and the history of the reception is recorded in the memory, the LED turns "on"/"off" until the history of the reception is confirmed;
   wherein the memory records therein at least one telephone number that is designated beforehand, the designated telephone number being of a potential originator of a call;
   the buzzer generates its alarming sound until the history of the reception is confirmed only in the case the telephone number of the reception coincides with the previously designated telephone number that is recorded in the memory; and
   the LED turns "on"/"off" until the history of the reception is confirmed only in the case the telephone number of the reception coincides with the previously designated telephone number that is recorded in the memory.

8. A portable telephone according to claim 7, wherein the buzzer generates its alarming sound for a prescribed time length in units of a prescribed time length until the history of the reception is confirmed; and the LED turns "on"/"off" for a prescribed time length in units of a prescribed time length until the history of the reception is confirmed.

9. A portable telephone in which a process of informing of a reception of an incoming voice call is performed during the reception by causing a buzzer to generate its alarming sound and causing a vibrator to vibrate and simultaneously a history of the reception is recorded in a memory, wherein
   in the case no response to the informing of the reception is made and the history of the reception is recorded in the memory, the buzzer generates its alarming sound until the history of the reception is confirmed; and
   in the case no response to the informing of the reception is made and the history of the reception is recorded in the memory, the vibrator vibrates until the history of the reception is confirmed;
   wherein the memory records therein at least one telephone number that is designated beforehand, the designated telephone number being of a potential originator of a call; and
   the buzzer generates its alarming sound until the history of the reception is confirmed only in the case the telephone number of the reception coincides with the previously designated telephone number that is recorded in the memory; and
   the vibrator vibrates until the history of the reception is confirmed only in the case the telephone number of the reception coincides with the previously designated telephone number that is recorded in the memory.

10. A portable telephone according to claim 9, wherein the buzzer generates its alarming sound for a prescribed time length in units of a prescribed time length until the history of the reception is confirmed; and the vibrator vibrates for a prescribed time length in units of a prescribed time length until the history of the reception is confirmed.

11. A portable telephone in which a process of informing of a reception of an incoming voice call is performed during the reception by causing an LED to turn "on"/"off" and causing a vibrator to vibrate and simultaneously a history of the reception is recorded in a memory, wherein in the case no response to the informing of the reception is made and the history of the reception is recorded in the memory, the LED turns "on"/"off" until the history of the reception is confirmed; and in the case no response to the informing of the reception is made and the history of the reception is recorded in the memory, the vibrator vibrates until the history of the reception is confirmed;

wherein the memory records therein at least one telephone number that is designated beforehand, the designated telephone number being of a potential originator of a call; and the LED turns "on"/"off" until the history of the reception is confirmed only in the case the telephone number of the reception coincides with the previously designated telephone number that is recorded in the memory; and the vibrator vibrates until the history of the reception is confirmed only in the case the telephone number of the reception coincides with the previously designated telephone number that is recorded in the memory.

12. A portable telephone according to claim 11, wherein the LED turns "on"/"off" for a prescribed time length in units of a prescribed time length until the history of the reception is confirmed; and the vibrator vibrates for a prescribed time length in units of a prescribed time length until the history of the reception is confirmed.

13. A portable telephone according to claim 11, wherein the generation of the reception sound is made at the time of the reception and, in the case no response to the informing of the reception is made and the history of the reception is recorded in the memory, a buzzer generates its alarming sound until the history of the reception is confirmed.

14. A portable telephone according to claim 13, wherein the buzzer generates its alarming sound for a prescribed time length in units of a prescribed time length until the history of the reception is confirmed; the LED turns "on"/"off" for a prescribed time length in units of a prescribed time length until the history of the reception is confirmed; and the vibrator vibrates for a prescribed time length in units of a prescribed time length until the history of the reception is confirmed.

15. A portable telephone according to claim 13 or 14, wherein the buzzer generates its alarming sound until the history of the reception is confirmed only in the case the telephone number of the reception coincides with the previously designated telephone number that is recorded in the memory;

the LED turns "on"/"off" until the history of the reception is confirmed only in the case the telephone number of the reception coincides with the previously designated telephone number that is recorded in the memory; and the vibrator vibrates until the history of the reception is confirmed only in the case the telephone number of the reception coincides with the previously designated telephone number that is recorded in the memory.

16. A portable telephone, comprising:

a wireless circuit that receives an incoming voice call;

a display circuit that displays a message indicating a termination of the voice call that is not answered after termination of the voice call; and a control circuit that generates a first sound during reception of the incoming voice call by the wireless circuit and that generates a second sound after termination of the voice call but before an erasing of the message from the display circuit, the second sound being generated only in the case an originating telephone number of the received voice call coincides with a previously designated telephone number that is recorded in a memory of the portable telephone.

17. The portable telephone according to claim 16, wherein the control circuit does not generate the second sound after the erasing of the message from the display circuit.

18. The portable telephone according to claim 16, wherein the control circuit generates the second sound repeatedly at intervals of a predetermined period of time, and the control circuit stops a repetition of generating the second sound after the erasing of the message from the display circuit.

19. The portable telephone according to claim 18, further comprising a memory that stores a reception history of the call, wherein the message is erased from the display circuit after a user of the portable telephone confirms the reception history.

* * * * *